United States Patent
Ruckenstein et al.

(10) Patent No.: US 6,639,013 B1
(45) Date of Patent: Oct. 28, 2003

(54) METHOD OF MAKING GRAFT, BLOCK-GRAFT AND STAR-SHAPED COPOLYMERS BY IN-SITU COUPLING REACTION

(75) Inventors: Eli Ruckenstein, Amherst, NY (US); Hongmin Zhang, Amherst, NY (US)

(73) Assignee: The Research Foundation of State University of New York, Amherst, NY (US)

(*) Notice: Subject to any disclaimer, the term of this patent is extended or adjusted under 35 U.S.C. 154(b) by 0 days.

(21) Appl. No.: 09/609,541

(22) Filed: Jul. 3, 2000

Related U.S. Application Data

(60) Provisional application No. 60/142,769, filed on Jul. 8, 1999.

(51) Int. Cl.[7] .............................................. C08F 293/00
(52) U.S. Cl. ........................... 525/71; 525/74; 525/241; 525/314; 525/208
(58) Field of Search ................................ 525/241, 314, 525/71, 74, 208

(56) References Cited

PUBLICATIONS

Grafting by In Situ Coupling Of Epoxy Groups of A Living Copolymer With An Anionic Living Polymer; Eli Ruckenstein and Hongmin Zhang; Chemical Engineering Department, State University Of New York At Buffalo, Amherst, New York 14260; J. Polym. Sci, Part A: Polym. Chem, pp. 105–112, Jan. 1, 1999.

Graft, Block–Graft and Star–Shaped Copolymers by an in Situ coupling Reaction; Hongmin Zhang and Eli Ruckenstein; Chemical Engineering Department, State University of New York at Buffalo, Amherst, New York 14260; Macromolecules; Reprinted from vol. 31, No. 15, pp. 4753–4759.

Nonlinear Block Copolymer Architectures; Marinos Pitsikalis, Stergios Pispas, Jimmy W. Mays, Nikos Hadjichristidis; Advances in Polymer Science, vol., 135; Springer–Verlag Berlin Heidelberg 1998.

*Primary Examiner*—Jeffrey Mullis
(74) *Attorney, Agent, or Firm*—Hodgson Russ LLP

(57) ABSTRACT

The present invention provides a method for the preparation of graft, block, and star-shaped copolymers. The method involves in situ coupling reaction between a living anionic backbone polymer possessing epoxy side chains and other living anionic polymers. The present method is simple, the coupling reaction is fast, pure copolymers are produced and the molecular weight, graft number and grafting position can be controlled to a greater extent than in existing methods.

17 Claims, 8 Drawing Sheets

METHOD OF MAKING GRAFT, BLOCK-GRAFT AND STAR-SHAPED COPOLYMERS BY IN-SITU COUPLING REACTION

This patent application claims priority to U.S. provisional patent application serial No. 60/142,769, filed on Jul. 8, 1999.

This invention was made with support from the National Science Foundation (Grant No. CTS 9712982). The Federal Government may retain certain rights in the invention.

FIELD OF THE INVENTION

The present invention generally relates to the synthesis of graft, block-graft and star-shaped copolymers.

BACKGROUND OF THE INVENTION

The living polymerization techniques have been used to synthesize well-defined graft copolymers (Rempp et. al., 1986, *Adv. Polym. Sci.*, 86:145; Sawamoto, 1991, Int. J. Polym. Mater, 15:197; Pitsikalis et al., 1988, Adv. Polym. Sci., 135:1). However, the previous methods have the disadvantages of being slow, and not yielding relatively pure products.

The preparation techniques of graft copolymers by living polymerization can be classified in "grafting onto," "grafting from," and "grafting through." Among these methods, the first is most often employed. Because the backbone and the side chain polymers are prepared separately, both the precursors and the final graft copolymer can be characterized accurately. The "grafting onto" method is bas ed on a coupling reaction between the functional groups of the backbone and another living polymer. When the anionic polymerization technique is employed, the backbone polymer should possess numerous electrophilic groups. The most thoroughly studied systems are poly(methyl methacrylate) and partially functionalized polystyrene as backbone and polystyrene, poly(α-methyl styrene) or poly(ethylene oxide) as side chains. However, in the coupling of the polystyryl anion with chloromethylated poly(styrene), or of the poly(α-methyl styryl) anion with poly(methyl methacrylate), the reaction ceased after some branches were grafted to the backbone polymer. This occurs in spite of the presence of numerous remaining functional groups on the backbone and is due to the hindrance caused by the side chains already introduced. The reduction in the reactivity of the remaining functional groups leads to graft copolymers with an uncontrolled low degree of grafting.

The epoxy group possesses a higher reactivity for the polystyryl anion than the ester and chloromethyl groups. The coupling between the epoxy group and the anionic living polystyrene was employed in the preparation of a graft copolymer consisting of a polystyrene backbone and a polystyrene side chains, by reacting the living polystyrene with a poly(p-vinylstyrene oxide) backbone or its styrene copolymer; a high degree of grafting was thus attained. See, M. Takaki et al., *Macromolecules*, 10, 845 (1977). However, the backbone polymers were prepared by radical homo- or co-polymerization, and had to be carefully purified by several reprecipitations followed by freeze-drying under high vacuum. Even with such precautions, the impurities were not removed and usually caused the deactivation of a fraction of the living polymers. Because of the presence of deactivated homopolymers, it was difficult to obtain pure graft polymers.

The present invention solves this problem which is found in the other types of living polymerization processes.

SUMMARY OF THE INVENTION

The present invention provides a method for the preparation of graft, block, and star copolymers. The method involves in situ coupling reaction between a living anionic backbone polymer possessing epoxy side chains and other living anionic polymers. Compared to the previous coupling methods for the preparation of graft copolymers, the present method is simple, the coupling reaction is fast, pure copolymers are produced, and the molecular weight, graft number and grafting position can be controlled to a greater extent than in existing methods.

DETAILED DESCRIPTION OF THE INVENTION

Figure 9:
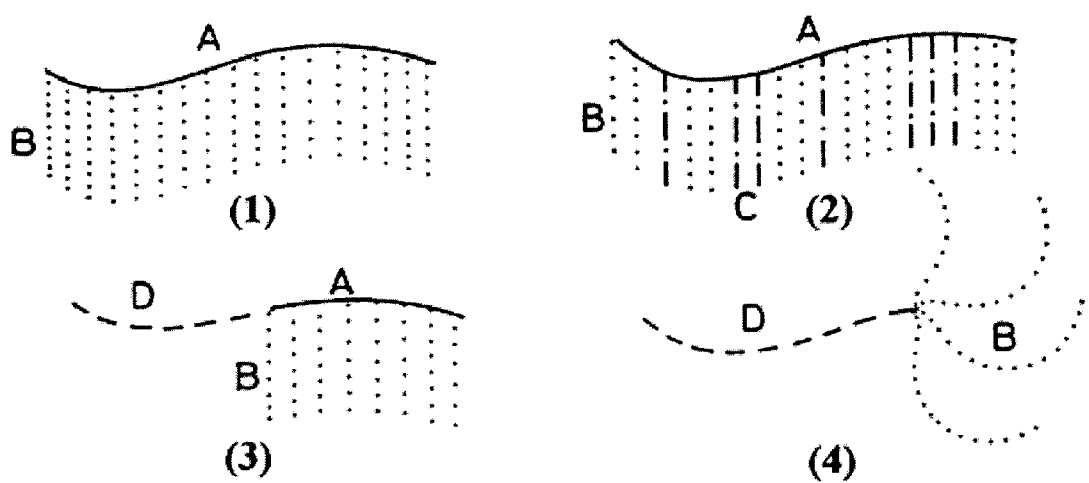
FIGS. 9:1, 9:2, 9:3 and 9:4 illustrate various schematic designs of copolymers.

The method of the present invention comprises the steps of preparing the backbone and the side chain polymers by the living anionic polymerization technique. The backbone polymer is not separated from its polymerization solution and it is directly reacted with other anionic living polymers (side chains). By using this procedure, the introduction of the impurities is avoided, the preparation process is greatly simplified and, as illustrated in FIGS. 9:1–4, the pure graft (FIG. 9:1—a AB graft copolymer and FIG. 9:2—an $AB_xC_y$ graft copolymer), block-graft (FIG. 9:3 $DAB_x$ graft copolymer; a random block copolymer is not illustrated), or star-shaped copolymers (FIG. 9:4) are obtained, wherein "A" represents poly(glycidyl methacrylate), "B" represents polystyrene, "C" is polyisoprene, "D" is poly(methyl methacrylate), and "a" is a short poly(glycidyl methacrylate) segment with a few repeating units.

In the preparation of the backbone copolymers, special bifunctional monomers containing epoxy ester groups, such as glycidyl methacrylate (GMA) are used. Using the method of the present invention, copolymers including, but not limited to, graft copolymers with a poly(GMA) backbone and polystyrene side chains; graft copolymers with a poly(GMA) backbone and both polystyrene and polyisoprene side chains; graft copolymers with a random copolymer backbone containing both poly(GMA) and poly (methyl methacrylate) (poly (MMA)) units and polystyrene and/or polyisophrene side chains; block graft copolymers with a block backbone consisting of poly(GMA) and poly(MMA) blocks, and polystyrene and/or polyisoprene side chains; and star-shaped copolymers containing only one poly(MMA) arm, and several polystyrene and/or polyisoprene arms.

The method of the present invention can be used to prepare several different copolymers such as graft, block-graft and star polymers. Thus, the in situ coupling reaction between a living anionic backbone polymer possessing epoxy side chains, such as the living anionic poly(glycidyl methacrylate (poly(GMA)), and other living anionic polymers such as polystyrene (poly(St)) and polyisoprene (poly (Is)). For example, upon introduction of a benzene solution of the living anionic poly(St) into a tetrahydrofuran (THF) solution of the living poly(GMA), a rapid coupling reaction between the epoxy groups of poly(GMA) and the propagating sites of the living poly(St) could generate a graft copolymer containing a polar backbone and nonpolar side chains. When benzene solutions of two anionic living polymers, such as poly(St) and poly(Is), were sequentially transferred to the THF solution of living poly(GMA), a graft copolymer possessing two different nonpolar side chains could be obtained. Further, the backbone can also be a copolymer.

For example, when a THF solution of the living anionic random copolymer of GMA and methyl methacrylate (MMA) was used, the other living polymers, such as poly (St), only reacted with the epoxy groups of the GMA units to generate a graft copolymer, and did not react with the carbonyl groups of MMA and GMA. When the backbone was a block copolymer, such as poly(MMA-b-GMA), its coupling reaction with other living anionic polymers, such as poly(St), generated a block-graft copolymer. In addition, when the poly(GMA) segment of the above block backbone was short, in relation to the other monomer, a star-shaped copolymer containing a poly(MMA) arm and several poly (St) arms could be obtained. All the above copolymers possess high purity, designed molecular architecture, controlled molecular weight and narrow molecular weight distribution.

The following embodiments are presented for illustrative purposes and are not to be construed as restrictive.

EXAMPLE 1

Preparation of the THF Solutions of Living Poly (GMA) by the Anionic Polymerization of GMS and of Living Block Copolymer of MMA and GMA by the Sequential Anionic Copolymerization of the Two Monomers.

All polymerizations, namely homopolymerizations of GMA, St, and Is and the block copolymerization of MMA and GMA, were carried out in a round-bottom glass flask under an over pressure of nitrogen with magnetic stirring. The anionic polymerization of GMA was performed in THF, at 45° C., in the presence of LiCl [LiCl]/[DPHL]$_0$=3). After THF, 1,1-diphenylethylene (DPE), and a THF solution of LiCl were added with dry syringes, the flask was cooled to −45° C. and n-BuLi (in hexane) was added. The deep red color of 1,1-diphenylhexyllithium (DPHL) appeared at once, and the reaction between n-BuLi and DPE was allowed to continue for 15 min. The polymerization reaction was induced by the addition of the prechilled GMA to the above system, and the reaction was allowed to last 1.0 h. Without termination and polymer separation, this THF solution was directly used in the next coupling reaction step with the living poly(St) or/and living poly(Is).

The preparation of the THF solution of the living block copolymer of MMA and GMA was carried out in a manner similar to that for living poly(GMA). However, as soon as the reaction of DPE and n-BuLi was completed, the solution was cooled to −70° C. and prechilled MMA added. After the polymerization lasted 40 min., the temperature was raised to −50° C., and then prechilled GMA was added and the block copolymerization was allowed to last 1.0 h. This THF solution of the living poly(MMA-b-GMA) was used in the preparation of DAB$_x$ graft and DaB$_x$ star-shaped copolymers.

Preparation of the THF Solution of Living Poly (MMA-co-GMA) by the Anionic Copolymerization of MMA and GMA The anionic copolymerization of MMA and GMA was performed in THF, at −50° C., in the presence of LiCl ([LiCl]/[DPHLi]$_0$=3). After THF, DPE and a THF solution of LiCl were added with dry syringes, the flask was cooled to −50° C. and n-BuLi (in hexane) was added. The deep red color of DPHLi appeared at once, and the reaction between n-BuLi and DPE was allowed to continue for 15 min. The polymerization reaction was induced by the addition of a prechilled mixture of MMA and GMA to the above system and the reaction was allowed to last 1.0 h. Without termination and polymer separation, this THF solution was directly used in the next coupling reaction step with the anionic living poly(St) or anionic living poly(Is).

Preparation of the Benzene Solution of Living Poly (St) (or Poly(Is)) by the Anionic Polymerization of St (or Is)

The anionic polymerization of St or Is was carried out using n-BuLi as initiator, in benzene, in the presence of a small amount of THF ([THF])=[n-BuLi]$_0$). After benzene, THF and the hexane solution of n-BuLi were introduced into a flask placed in 10° C. water bath, the polymerization was started by adding St (or Is) to the above system. After 10 min., the temperature was raised to 25° C. and the polymerization reaction was allowed to last 1.0 h. The benzene solution thus obtained was directly employed in the next coupling reaction step.

EXAMPLE 2

Coupling Reactions and Measurements

The coupling reaction was carried out with vigorous magnetic stirring, at −30° C., for 30 min. For preparation of the AB$_x$ graft copolymer, the benzene solution of living poly(St) was transferred to the THF solution of living poly(GMA). In the case of AB$_x$C$_y$ graft copolymer, the benzene solutions of both living poly(St) and poly(Is) were sequentially transferred. The DAB$_x$ block-graft copolymer or DaB$_x$ star-shaped copolymer was prepared in the same way as the AB$_x$ graft copolymer, except that the THF solution of living poly(GMA) was replaced by that of living poly(MMA-b-GMA). Although the coupling reaction occurred rapidly, it was still allowed to last 30 min. to ensure a complete conversion. Then, the reaction was quenched, by adding a small amount of methanol. The polymer was reprecipitated by pouring again its THF solution into methanol and finally vacuum-dried overnight. Coupling Reaction between the Epoxy Groups of Living Poly (MMA-co-GMA) with the Living Sites of Poly(St) or Poly(Is)

The coupling reaction was carried out with vigorous magnetic stirring, at −30° C., for 30 min. The benzene solution of living poly(St) or poly(Is) was transferred to the THF solution of living poly(MMA-co-GMA). Even though this coupling reaction is very rapid, it was still allowed to last 30 min. in order to ensure a complete conversion. Then, the reaction was quenched by adding a small amount of methanol, and the reaction mixture was poured into methanol to precipitate the polymer. The polymer was reprecipitated by pouring again its THF solution into methanol and finally it was vacuum-dried overnight.

Measurements $^1$H NMR spectra were recorded in CDCl$_3$ on a VXR-400 spectrometer. M$_n$ and M$_w$/M$_n$ of the polymer were determined by gel permeation chromatography (GPC) on the basis of a polystyrene calibration curve. The GPC measurements were carried out using THF as solvent, at 30° C., with a 1.0 mL/min. flow rate and a 1.0 cm/min. chart speed. Three polystyrene gel columns (Waters, 7.8×300 mm; one HR 5e, Part No. 44228, one Linear, Part No. 10681, and one HR 4E, Part No. 44240) were used, which were connected to a Waters 515 precision pump.

EXAMPLE 3

Synthesis of AB$_x$ (or AC$_y$) Graft Copolymer

Figure 1:
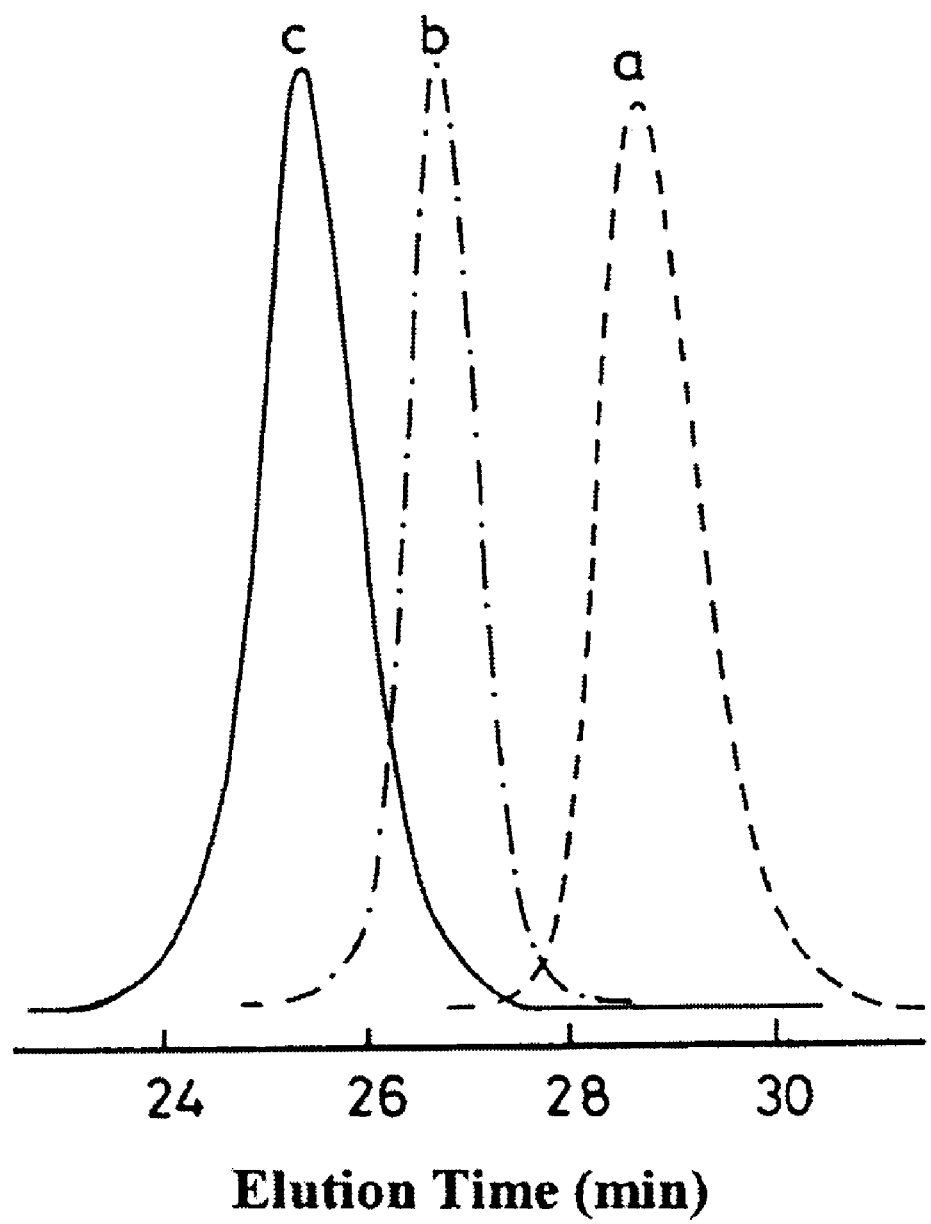
FIG. 1 is a representation of GPC traces of the $AB_x$ graft copolymer and its precursors.
Figure 2:
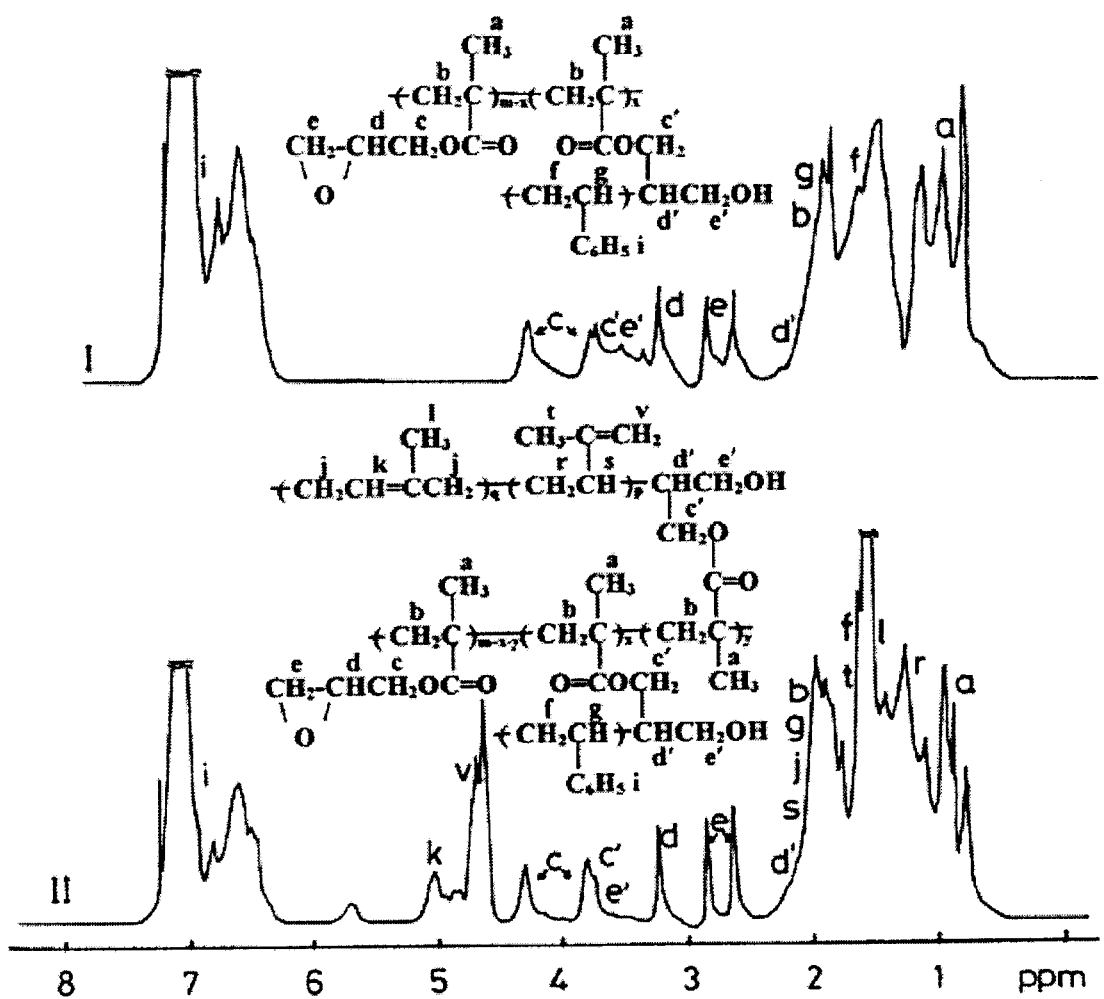
FIG. 2 is a representation of the $^1H$ NMR spectra of $AB_x$ and $AB_xC_y$ graft copolymers.

The synthesis of the THF solution of living poly(GMA) was prepared by a method discussed in more details above and possibly in other conventional methods known to those skilled in the art. The coupling reaction between the epoxy groups of living poly(GMA) and the living sites of poly(St) or poly(Is) was carried out with vigorous magnetic stirring, at −30° C., for 30 min. As soon as the benzene solution of the living poly(St) was introduced into the THF solution of the living poly(GMA), the deep red color of the living poly(St) disappeared, implying that the coupling took place immediately. As shown in FIG. 1, the GPC peaks corresponding to living poly(St) (peak a) and the living poly (GMA) (peak b) disappeared completely and a new single peak (peak c) due to the formation of the graft copolymer emerged. As shown in the $^1$H NMR spectrum (FIGS. 2-I and II), besides the peaks (a,b,c,d,and e) belonging to the backbone polymer, poly(GMA), the peaks (f,g, and i) of the poly(St) side chains are also present. The combination of GPC and $^1$H NMR measurements indicate that a pure graft copolymer, free of precursor and having a poly(GMA) backbone and poly(St) side chains, was obtained.

As shown in Tables 1 and 2 (shown below), the grafting efficiency (f) can be controlled through the molar ratio of the living poly(St) and epoxy groups, f=mol$_{PSt}$/mol$_{epoxy}$.

TABLE 1

Preparation Conditions of AB$_x$ (or AC$_y$) Graft Copolymer[a]

| | living poly (GMA) | | | | | living poly (St) or poly (Is) | | |
|---|---|---|---|---|---|---|---|---|
| no. | M$_n$[b] | M$_w$/M$_n$[b] | m[c] | mmol$_{epoxy}$[d] | | M$_n$[b] | M$_w$/M$_n$[b] | mmol[e] |
| AB$_x$-1 | 4050 | 1.07 | 26.8 | 14.1 | PSt | 1330 | 1.10 | 2.22 |
| AB$_x$-2 | 4940 | 1.06 | 33.1 | 14.1 | PSt | 1180 | 1.13 | 3.04 |
| AC$_y$-1 | 3900 | 1.09 | 25.8 | 14.1 | PIs | 1430 | 1.14 | 2.06 |

[a]The coupling reaction was carried out by introducing the benzene solution of living poly (St) or poly (Is) into the THF solution of living poly (GMA) with vigorous magnetic stirring. The reaction was allowed to last 30 min at −30° C.
[b]Determined by GPC.
[c]Polymerization degree (m) of poly (GMA).
[d]Molar amount of epoxy groups (equal to the amount of GMA).
[e]Molar amount of living poly (St) or poly (Is) (equal to the amount of n-BuLi used for the preparation of the corresponding living polymer).

TABLE 2

Characterization of AB$_x$ (or AC$_y$) Graft Copolymer

| | | | 10$^{-3}$ M$_n$ | | |
|---|---|---|---|---|---|
| no. | f,[a] % | N[b] | calcd[c] | obsd[d] | M$_w$/M$_n$[d] |
| AB$_x$-1 | 15.7 | 4.2 | 9.64 | 9.32 | 1.18 |
| AB$_x$-2 | 21.6 | 7.1 | 13.3 | 12.1 | 1.19 |
| AC$_y$-1 | 14.6 | 3.8 | 9.33 | 8.2 | 1.18 |

[a]Grafting efficiency, f = mol$_{(PSt\ or\ PIs)}$/mol$_{epoxy}$ (See Table 1).
[b]Graft number in each poly(GMA) chain, N = fm.
[c]Calculated with the expression M$_k$ = M$_{n(poly(GMA))}$ + NM$_{n(PSt\ or\ PIs)}$.
[d]Determined by GPC.

EXAMPLE 4

Synthesis of $AB_xC_y$ Graft Copolymer

The "grafting onto" technique (coupling method) is suitable for the preparation of this kind of polymer. For the graft polymer $AB_xC_y$ (Table 3, as shown immediately below), three kinds of living polymers were prepared simultaneously.

TABLE 3

Synthetic Conditions of $AB_xC_y$ Graft Copolymer[a]

| | living poly (GMA) | | | | living poly (St) | | | living poly (Is) | | |
|---|---|---|---|---|---|---|---|---|---|---|
| no. | $M_n^b$ | $M_w/M_n^b$ | $m^c$ | $mmol_{epoxy}^d$ | $M_n^b$ | $M_w/M_n^b$ | $mmol^e$ | $M_n^b$ | $M_w/M_n^b$ | $mmole^f$ |
| $AB_xC_y$-1 | 5960 | 1.10 | 40.3 | 14.1 | 1420 | 1.12 | 2.06 | 1490 | 1.10 | 1.97 |
| $AB_xC_y$-2 | 8360 | 1.15 | 57.2 | 14.1 | 1090 | 1.14 | 3.29 | 1070 | 1.13 | 3.35 |

[a]The coupling reaction was carried out by introducing the benzene solutions of living poly (St) or poly (Is) into the THF solution of living poly (GMA) sequentially, with vigorous magnetic stirring. The reaction was allowed to last 40 min at −30° C.
[b-d]See Table 1.
[e]Molar amounts of living poly (St).
[f]Molar amounts of living poly (Is).

Figure 3:
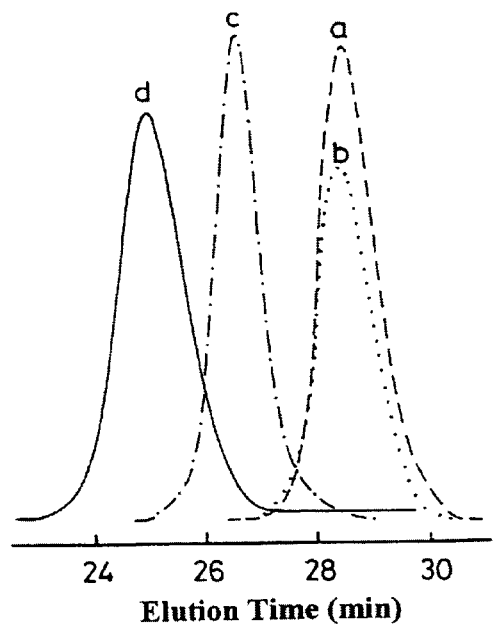
FIG. 3 is a representation of GPC traces of the $AB_xC_y$ graft copolymer and its precursors.

As shown in Table 3, and FIG. 3, the Mn of living poly(St) (peak a in FIG. 3) is almost equal to that of living poly(Is) (peak b in FIG. 3) and their molar ratios are almost equal. As shown in FIG. 3, a new single peak corresponding to the graft copolymer appears in the higher molecular weight range (peak d) and no peak due to precursor polymers remains. Therefore the graft polymer consists of a poly (GMA) backbone and both poly(St) and poly(Is) side chains. The calculated grafting efficiencies and graft numbers are listed in Table 4, shown immediately below.

TABLE 4

Characterization of $AB_xC_y$ Graft Copolymer

| | | | | | $10^{-3} M_n$ | | |
|---|---|---|---|---|---|---|---|
| no. | $f_{PSt,}^a$ % | $N_{PSt}^b$ | $f_{PIs,}^c$ % | $N_{PIs}^d$ | $calcd^e$ | $obsd^f$ | $M_w/M_n^f$ |
| $AB_xC_y$-1 | 14.5 | 5.9 | 14.0 | 5.6 | 22.7 | 17.1 | 1.21 |
| $AB_xC_y$-2 | 23.3 | 13.3 | 23.8 | 13.6 | 37.4 | 27.5 | 1.23 |

[a]Grafting efficiency of poly (St), $f_{PSt} = mol_{PSt}/mol_{epoxy}$.
[b]Graft number of poly (St) in each poly (GMA) chain, $N_{PSt} = mf_{PSt}$.
[c]Grafting efficiency of poly (Is), $f_{PIs} = mol_{PIs}/mol_{epoxy}$.
[d]Graft number of poly (Is) in each poly (GMA) chain, $N_{PIs} = mf_{PIs}$.
[e]Calculated with the expression: $M_k = M_{n(poly\ (GMA))} + N_{PSt}M_{n(PSt)} + N_{PIs}M_{n(PIs)}$.
[f]Determined by GPC.

EXAMPLE 5

Synthesis of $DAB_x$ Block-Copolymer

As demonstrated herein, in the presence of poly(GMA), the living poly(St) reacts with the epoxy groups of poly (GMA) and that the poly(MMA) remains unreacted. In other words, the reactivity of epoxy is much higher than that of carbonyl. Therefore, when the living poly(St) is mixed with the block copolymer of MMA and GMA, the former will selectively react with the epoxy groups of the poly(GMA) segment. In this manner, a block-graft copolymer consisting of a poly(MMA-b-GMA) block backbone and poly(St) side chains attached to the poly(GMA) segment can be generated.

Figure 4:
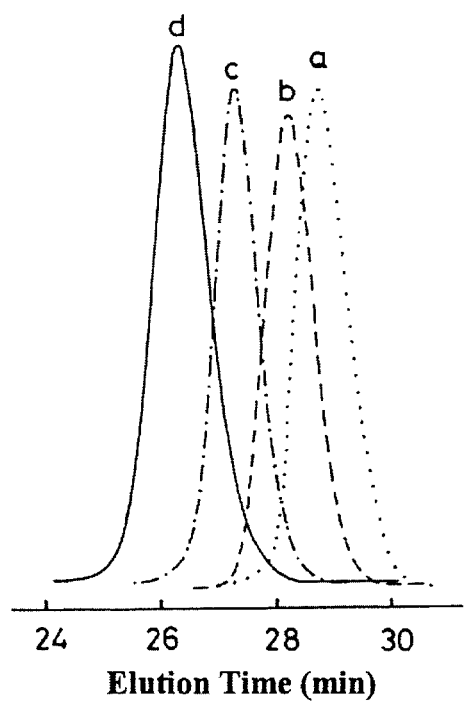
FIG. 4 is a representation of the GPC traces of $DAB_x$ block-graft copolymers.

The GPC traces of the block-graft copolymer is shown in FIG. 4. The living poly(MMA) peak is shown as peak a.

Figure 6:
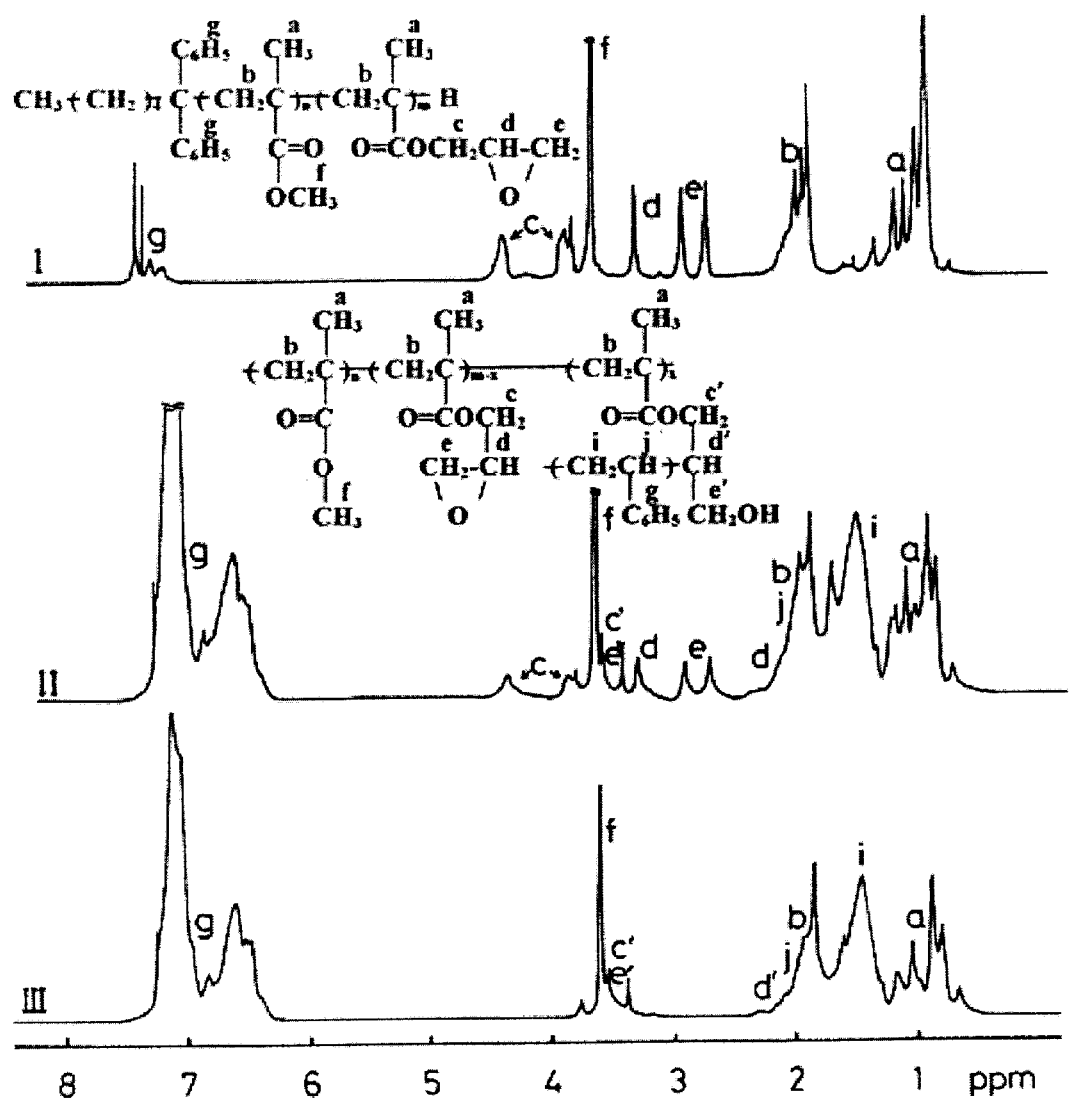
FIG. 6 is a representation of the $^1H$ NMR spectra of poly(MMA-b-GMA) and $DAB_x$ star-shaped copolymer.

After GMA is introduced into the system, the GPC peak shifted to a higher molecular weight position (peak c), and no poly(MMA) precursor remained. This indicates that all the living sites of poly(MMA) were consumed to initiate the polymerization of GMA and the block copolymer thus obtained had a controlled molecular weight and a narrow molecular weight distribution. As shown by $^1H$ NMR spectra, in FIG. 6-I, besides the peaks a,b,c,d, and e due to the poly(GMA) segment, the absorptions a,b, and f due to the poly(MMA) segment are also present. In addition, as shown in FIG. 6-II poly(St) side chains are seen as peaks g,i, and j. Thus, a pure block-graft copolymer consisting of a poly(MMA-b-GMA) backbone and poly(St) side chain was obtained. The graft numbers of molecular weights are shown in Table 5.

TABLE 5

Characterization of $DAB_x$ Block-Graft Copolymer

| | | | | $10^{-3} M_n$ | | |
|---|---|---|---|---|---|---|
| no. | $f,^a$ % | $m,^b$ % | $N^c$ | $calcd^d$ | $obsd^e$ | $M_w/M_n^e$ |
| $DAB_x$-1 | 22.2 | 12.1 | 2.7 | 8.40 | 9.42 | 1.18 |
| $DAB_x$-2 | 26.6 | 11.4 | 3.0 | 7.18 | 7.41 | 1.12 |
| $DAB_x$-3 | 40.0 | 19.7 | 7.9 | 13.2 | 10.8 | 1.15 |

[a]Grafting efficiency, $f = mol_{PSt}/mol_{epoxy}$.
[b]Polymerization degree (m) of poly(GMA) segment.
[c]Graft number in each backbone, $N = fm$.
[d]Calculated with the expression $M_k = M_{n(block)} + NM_{n(PSt)}$.
[e]Determined by GPC.

EXAMPLE 6

Synthesis of $DaB_x$ Star Copolymers

Figure 5:
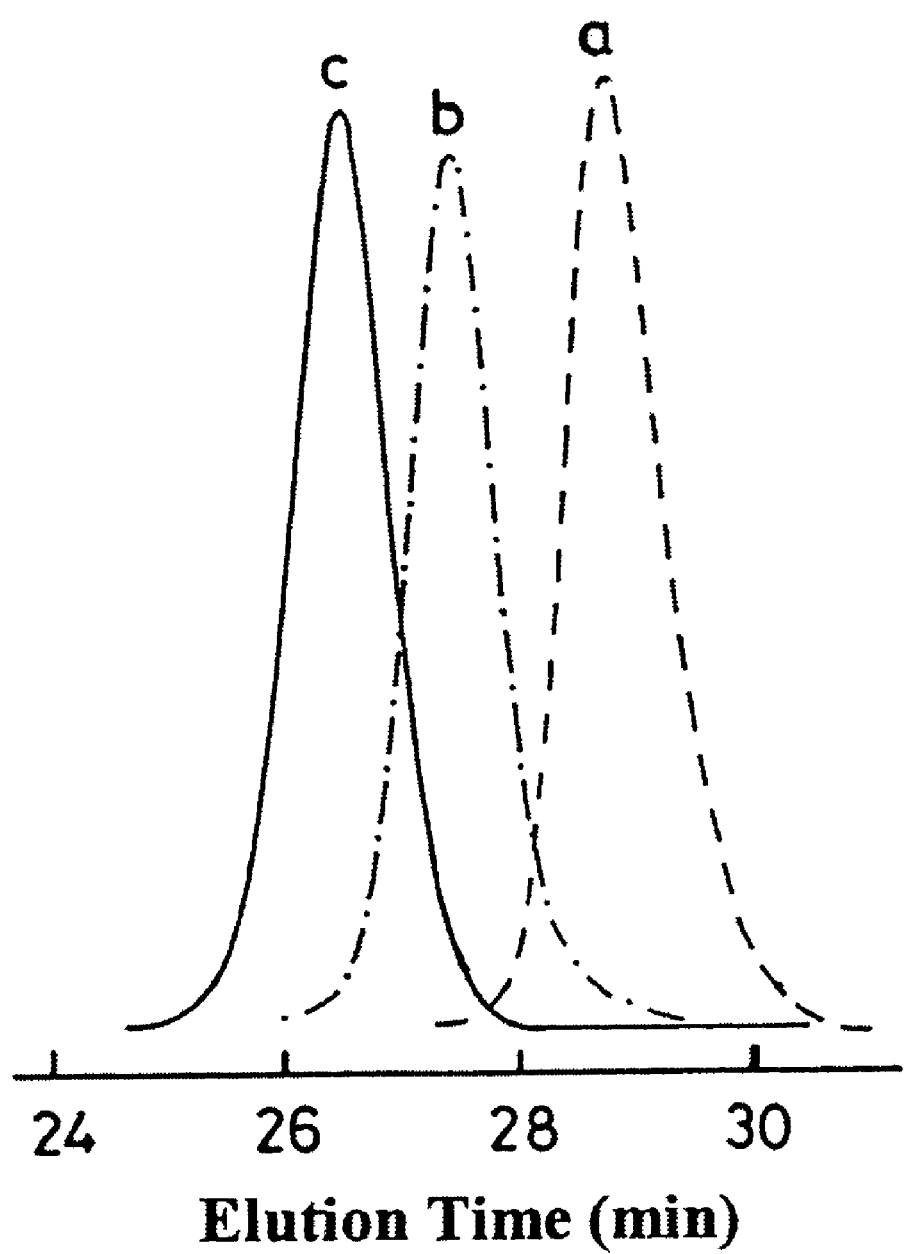
FIG. 5 is a representation of GPC traces of the $DAB_x$ star-shaped copolymer and its precursors.

In the coupling reaction, the molar amount of living poly(St) employed was selected to be equal to that of epoxy groups. As illustrated in FIG. 5, when the benzene solution of living poly(St) was added to the THF solution of the living poly(MMA-b-GMA) the coupling reaction took place and a star-shaped copolymer with a high molecular weight and narrow molecular weight distribution was obtained. FIG. 6-III represents $^1H$ NMR spectra of a star-shaped copolymer, ($DaB_x$-2, Tables 6 and 7, as shown immediately below). The absorptions due to poly(MMA) component (peaks a,b, and f) and due to poly(St) component (peaks g,i,j) can be easily detected. However, the absorptions corresponding to the poly(GMA) segment can hardly be detected. This copolymer can thus be considered a star-shaped copolymer that consists of just two components, poly(MMA) and poly(St).

TABLE 6

Preparation Conditions of DAB$_x$ Block-Graft and DaB$_x$ Star-Shaped Copolymers[a]

| no. | living poly (MMA-b-GMA) | | | | living poly (St) | | |
|---|---|---|---|---|---|---|---|
| | $M_n^b$ | $M_w/M_n^b$ | $W_{MMA}W_{GMA}^c$ | mmole$_{epoxy}^d$ | $M_n^b$ | $M_w/M_n^b$ | mmol[e] |
| DAB$_x$-1 | 3670 | 1.08 | 50/50 | 14.1 | 1750 | 1.08 | 3.13 |
| DAB$_x$-2 | 3400 | 1.07 | 50/50 | 14.1 | 1260 | 1.09 | 3.75 |
| DAB$_x$-3 | 5830 | 1.07 | 50/50 | 14.1 | 930 | 1.13 | 5.63 |
| DaB$_x$-1 | 2340 | 1.09 | 80/20 | 3.52 | 1010 | 1.10 | 3.60 |
| DaB$_x$-2 | 2350 | 1.10 | 80/20 | 3.52 | 1740 | 1.09 | 3.60 |
| DaB$_x$-3 | 3150 | 1.08 | 69/31 | 6.34 | 1020 | 1.10 | 6.50 |

[a]The coupling reaction was carried out by introducing the benzene solution of living poly (St) into the THF solution of the living block copolymer of MMA and GMA with vigorous magnetic stirring. The reaction was allowed to last 30 min at −30° C.
[b]Determined by GPC.
[c]Weight percent of poly (MMA) and poly (GMA) segments, respectively.
[d]Molar amounts of epoxy groups.
[e]Molar amounts of living poly (St).

TABLE 7

Characterization of DaB$_x$ Star-Shaped Copolymer

| no. | m[a] | N[b] | $M_{n(PMMA)}/M_{n(PSt)}^c$ | $10^{-3} M_n$ | | $M_w/M_n^e$ |
|---|---|---|---|---|---|---|
| | | | | calcd[d] | obsd[e] | |
| DaB$_x$-1 | 3.0 | 4.0 | 1680/1010 | 5.37 | 4.40 | 1.12 |
| DaB$_x$-2 | 3.0 | 4.0 | 1690/1740 | 7.57 | 6.80 | 1.14 |
| DaB$_x$-3 | 6.4 | 7.4 | 2010/1020 | 9.68 | 7.83 | 1.10 |

[a]Polymerization degree (m) of poly(GMA) segment.
[b]Arm number of the star-shaped copolymer, N = m + 1.
[c]The molecular weights of poly(MMA) arm and each poly(St) arm, respectively.
[d]Calculated with the expression $M_k = M_{n(block)} + mN_{n(PSt)}$.
[e]Determined by GPC.

EXAMPLE 7

Synthesis of Random Copolymer

Before the random copolymer is created, the monomers must be purified. In this example, monomers are methyl methacrylate (MMA) and glycidyl methacrylate (GMA). MMA was washed with 10% aqueous sodium hydroxide solution and then with water, dried overnight with MgSO$_4$, distilled over CaH$_2$ and finally distilled in the presence of triisobutylaluminum prior to polymerization. In contrast, GMA was dried over CaH$_2$ with magnetic stirring, under reduced pressure for more than 24 hours, vacuum distilled slowly and the middle fraction (about half of the volume) was recovered and distilled twice over CaH$_2$ prior to polymerization.

All polymerization, namely the homopolymerization of St or Is and the random copolymerization of MMA and GMA, were carried out in a round-bottom glass flask under an over pressure of nitrogen, with magnetic stirring. The anionic copolymerization of MMA and GMA was performed in THF, at −500° C., in the presence of LiCl ([LiCl]/[DPHL]$_0$=3). After THF, DPE and a THF solution of LiCl were added with dry syringes, the flask was cooled to −50° C. and n-BuLi (in hexane) was added. The polymerization reaction was induced by the addition of a prechilled mixture of MMA and GMA to the above system and the reaction was allowed to last 1.0 hour. Without termination and polymer separation, this THF solution was directly used in the next coupling reaction step with the anionic living poly(St) or anionic living poly(Is).

The anionic polymerization of St or Is was carried out using sec-BuLi or n-BuLi as an initiator and benzene or cyclohexane as the solvent. When n-BuLi was used, a small amount of THF ([THF]=[n-BuLi]$_0$) was added. After the benzene and a hexane solution of the initiator were introduced into a flask placed in a 10° C. water bath, the polymerization was started by adding St (or Is) to the above system. After 10 minutes, the temperature was raised to 25° C. and the polymerization was allowed to last 1.0 hour. After a trace solution was taken out for gel permeation chromatography (GPC) measurements, the benzene solution thus obtained was directly employed in the next coupling reaction step.

The coupling reaction was carried out with vigorous magnetic stirring, at −30° C., for 30 minutes. The benzene solution of living poly(St) or poly(Is) was transferred to the THF solution of living poly(MMA-co-GMA). Even though this coupling reaction is very rapid, it was still allowed to last 30 minutes in order to ensure a complete conversion. Then, the reaction was quenched by adding a small amount of methanol, and the reaction mixture was poured into methanol to precipitate the polymer. The polymer was reprecipitated by pouring again its THF solution into methanol and finally vacuum-dried overnight.

Figure 7:
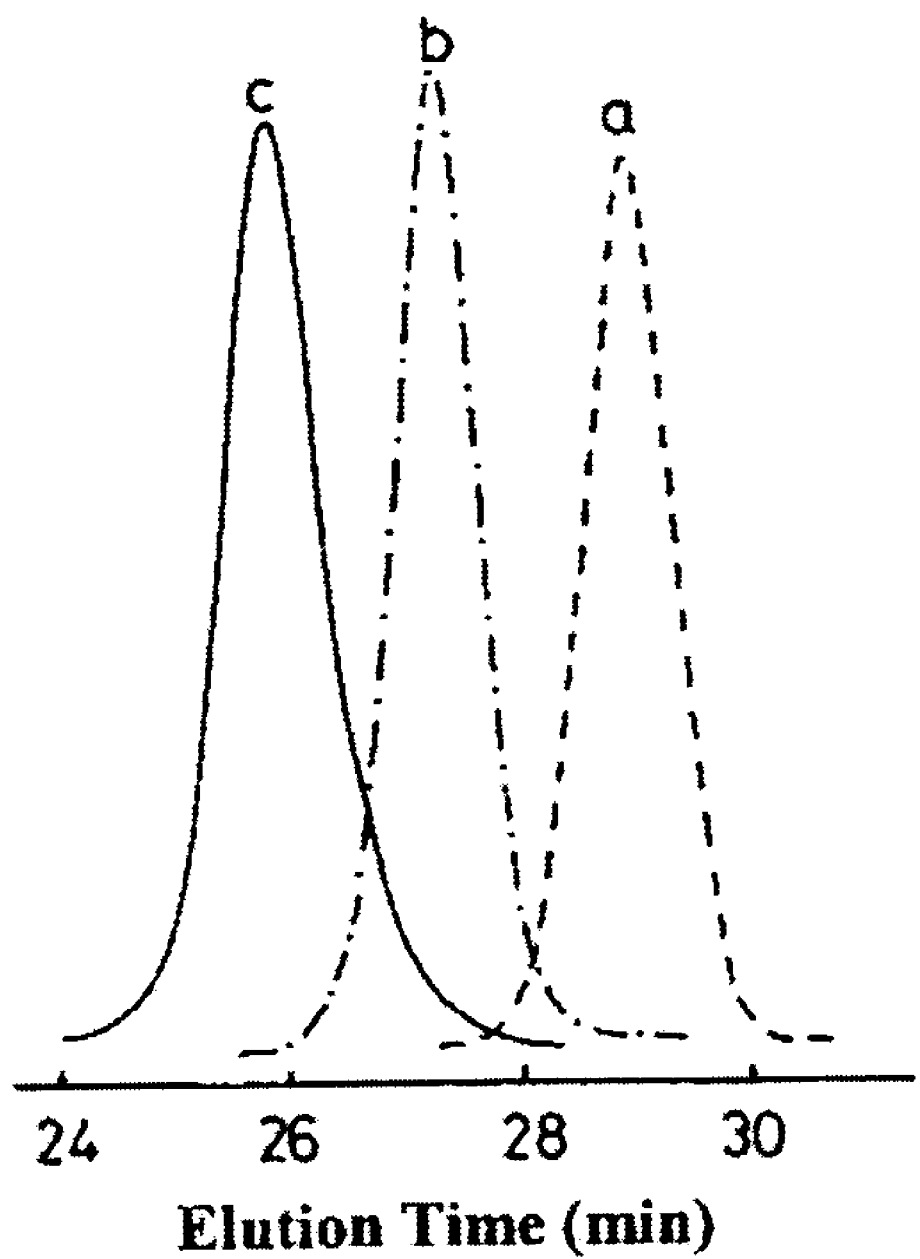
FIG. 7 is a representation of GPC traces of a graft copolymer and its precursors.
Figure 8:
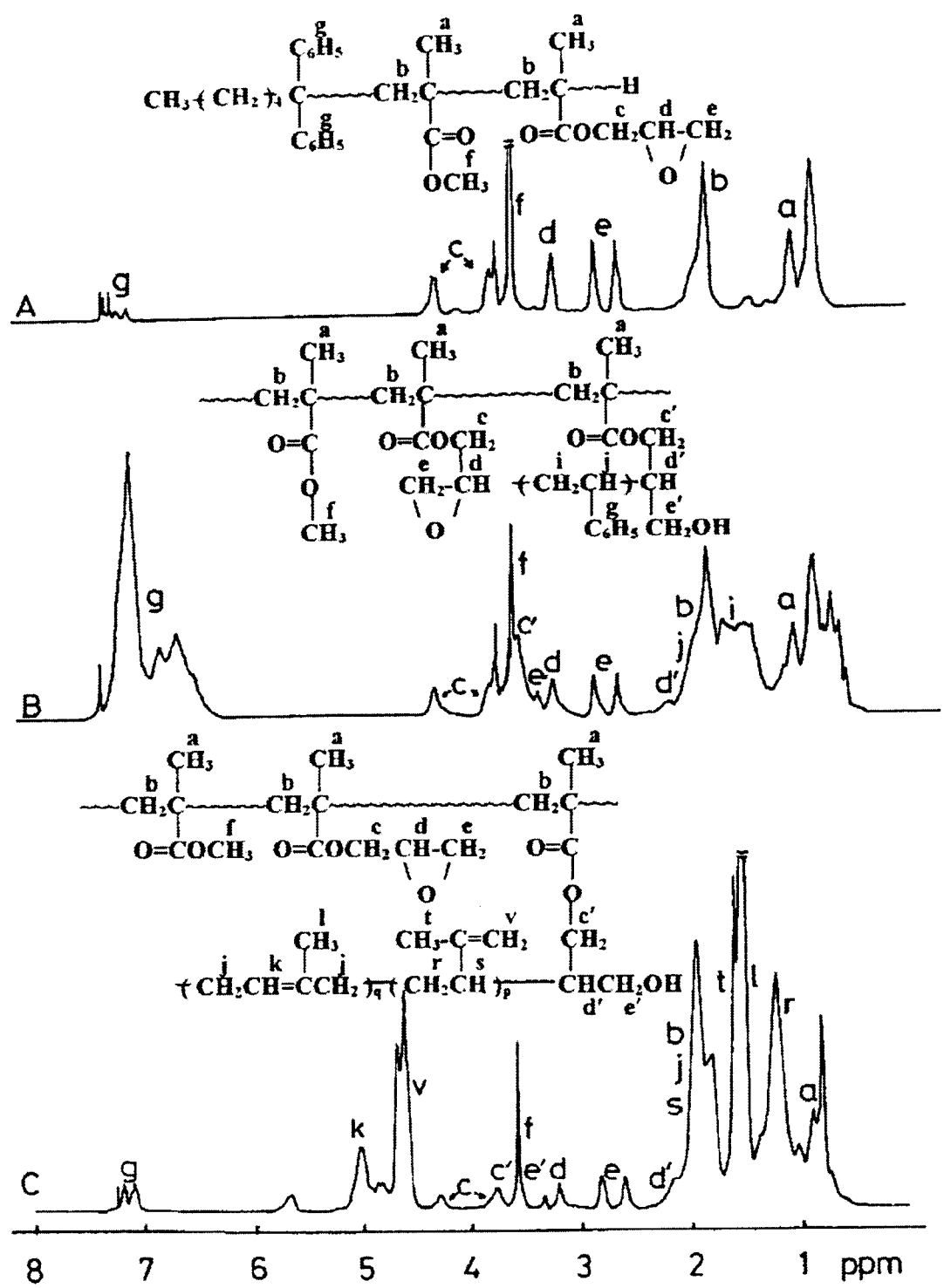
FIGS. 8A–C are representations of the $^1H$ NMR spectra of poly(MMA-co-GMA) and graft copolymers.

As shown in FIG. 7, GPC peaks corresponding to living poly(St) (peak a) and the living poly (MMA-co-GMA) (peak b) disappeared and a single new peak due to the graft copolymer emerged (peak c). FIGS. 8B and 8C present the $^1$H NMR spectra of the graft copolymers GP-1 and GP-2 (Table 8, as shown immediately below) respectively.

TABLE 8

Synthesis of Graft Copolymer by the Coupling Reaction[a]

| no. | backbone | | side chain | | f[x] | | $10^{-3}$ Mn | | |
|---|---|---|---|---|---|---|---|---|---|
| | no.[b] | mmol$_{epoxy}$ | no.[d] | mmol[c] | % | N[h] | calc[j] | obsd[k] | $M_w/M_n$[k] |
| GP-1 | CP-1 | 7.04 | PSt-1 | 2.03 | 28.8 | 2.8 | 5.56 | 5.87 | 1.19 |
| GP-2 | CP-1 | 7.04 | PSt-1 | 4.06 | 57.6 | 5.6 | 8.12 | 8.31 | 1.13 |
| GP-3 | CP-3 | 7.04 | PSt-3 | 1.30 | 18.5 | 1.1 | 4.96 | 5.33 | 1.15 |
| GP-4 | CP-4 | 7.04 | PSt-4 | 5.10 | 72.4 | 5.7 | 5.96 | 6.01 | 1.11 |
| GP-5 | CP-5 | 7.04 | PSt-5 | 1.21 | 17.2 | 4.1 | 17.9 | 14.5 | 1.20 |
| GP-11[l] | CP-11 | 14.08 | PIs-11 | 3.05 | 21.7 | 1.6 | 4.65 | 6.13 | 1.57 |
| GP-12 | CP-12 | 14.08 | PIs-12 | 3.30 | 23.4 | 2.6 | 6.83 | 7.59 | 1.17 |
| GP-13 | CP-13 | 14.08 | PIs-13 | 4.87 | 34.6 | 4.2 | 8.66 | 7.95 | 1.21 |

[a]The coupling reaction was carried out by introducing the benzene solution of living poly (St) or poly (Is) into the THF solution of living poly (MMA-co-GMA), with vigorous magnetic stirring. The reaction was allowed to last 30 min at −30° C.
[b]See Table 1.
[c]Molar amount of epoxy groups is equal to that of GMA.
[d]See Table 2.
[e]Molar amount of living poly (St) or poly (Is) is equal to that of the initiator, sec-BuLi or n-BuLi.
[g]Degree of grafting: $f = mol_{(PSt\ or\ PIs)}/mol_{epoxy}$.
[h]Graft number in each poly (MMA-co-GMA) chain: $N = f \cdot m$.
[j]Calculated with the expression: $M_k = M_{n(poly\ (MMA-co-GMA))} + N \cdot M_{n(PSt\ or\ PIs)}$.
[k]Determined by GPC on the basis of a poly (St) calibration curve.
[l]A cyclohexane solution of living poly (Is) was used instead of a benzene solution.

The former consists of a poly(MMA-co-GMA) backbone and poly(St) side chains and the latter has the same backbone but poly(Is) side chains. Besides peaks a,b,c,d,e, and f belonging to the backbone polymer (shown in FIG. 8A), the peaks g,i,j in FIG. 8B belong to the poly(St) side chains and j,k,l,r,s,t and v in FIG. 8C to the poly(Is) side chains. These data indicate that the pure graft copolymers, free of a precursor polymers, and consisting of a poly(MMA-co-GMA) backbone and poly(St) or poly(Is) side chains were obtained. As shown in Table 8, the degree of grafting can be controlled via the molar ratio of the anionic living poly(St) (or poly(Is)) and epoxy groups.

Numerous variations will occur to those skilled in the art. It is intended therefore, that the foregoing descriptions be only illustrative of the present invention and that the present invention be limited only by the hereinafter appended claims

We claim:

1. A method for preparing a copolymer comprising:
    providing a mixture of an epoxified first anionic living polymer in a first solution and at least a second anionic living polymer in a second solution; and
    reacting the mixture under conditions effective to form the copolymer wherein the first anionic living polymer is a backbone of the copolymer and the second anionic living polymer is a side chain of the backbone.

2. The method of claim 1 wherein the epoxified first anionic living polymer contains at least one bifunctional monomer.

3. The method of claim 2 wherein the bifunctional monomer has an epoxy ester group and a carbonyl group.

4. The method of claim 2 wherein the bifunctional monomer is glycidyl methacrylate.

5. The method of claim 1 wherein the epoxified first anionic living polymer is selected from the group consisting of poly(glycidyl methacrylate), and a block copolymer of poly(glycidyl methacrylate), and poly(methyl methacrylate).

6. The method of claim 1 wherein the epoxified first anionic living polymer is a homopolymer, a block copolymer, or a random copolymer.

7. The method of claim 1 wherein the first solution and the second solution are different.

8. The method of claim 1 wherein the second anionic living polymer is a homopolymer.

9. The method of claim 1 wherein the second anionic living polymer in a second solution and a third anionic living polymer in a third solution are mixed with the epoxified first anionic living polymer in the first solution; and reacting the mixture under conditions effective to form the copolymer wherein the first anionic living polymer is the backbone of the copolymer and the second anionic living polymer and the third anionic living polymer are the side chains of the backbone.

10. A method for preparing a copolymer comprising:
    providing a mixture of a first anionic living polymer having a bifunctional monomer with an epoxy group and being in a first solution, and a second anionic living polymer in a second solution; and
    reacting the mixture under conditions effective to form the copolymer wherein the first anionic living polymer is a backbone of the copolymer and the second anionic living polymer is a side chain of the backbone.

11. The method of claim 10 wherein the bifunctional monomer has an epoxy ester group and a carbonyl group.

12. The method of claim 10 wherein the bifunctional monomer is glycidyl methacrylate.

13. The method of claim 10 wherein the first anionic living polymer is selected from the group consisting of poly(glycidyl methacrylate), and a block copolymer of poly(glycidyl methacrylate) and poly(methyl methacrylate).

14. The method of claim 10 wherein the first anionic living polymer is a homopolymer, a block copolymer, or a random copolymer.

15. The method of claim 10 wherein the first solution and the second solution are different.

16. The method of claim 10 wherein the second anionic living polymer is a homopolymer.

17. The method of claim 10 wherein the second anionic living polymer in a second solution and a third anionic living polymer in a third solution are mixed with the first anionic living polymer in the first solution; and reacting the mixture under conditions effective to form the copolymer wherein the first anionic living polymer is the backbone of the copolymer and the second anionic living polymer and the third anionic living polymer are the side chains of the backbone.

* * * * *